United States Patent [19]
Lange

[11] Patent Number: 5,978,878
[45] Date of Patent: Nov. 2, 1999

[54] SELECTIVE LATENCY REDUCTION IN BRIDGE CIRCUIT BETWEEN TWO BUSSES

[75] Inventor: Ronald Edwin Lange, Glendale, Ariz.

[73] Assignee: VLSI Technology, San Jose, Calif.

[21] Appl. No.: 08/718,969

[22] Filed: Sep. 26, 1996

[51] Int. Cl.[6] .................................................. G06F 13/38
[52] U.S. Cl. .......................... 710/129; 710/128; 710/101; 710/9; 710/3; 710/57; 713/400
[58] Field of Search ..................... 395/829, 281, 395/308, 823, 250, 309, 550; 364/900; 710/129, 128, 101, 9, 3; 713/400

[56] References Cited

U.S. PATENT DOCUMENTS

| | | | |
|---|---|---|---|
| 4,751,671 | 6/1988 | Babetski et al. | 364/900 |
| 5,079,693 | 1/1992 | Miller | 395/250 |
| 5,434,996 | 7/1995 | Bell | 395/550 |
| 5,522,086 | 5/1996 | Burton et al. | 395/829 |
| 5,557,750 | 9/1996 | Moore et al. | 395/250 |
| 5,564,026 | 10/1996 | Amini et al. | 395/308 |
| 5,592,682 | 1/1997 | Chejlava, Jr. et al. | 395/823 |
| 5,608,876 | 3/1997 | Cohen et al. | 395/281 |
| 5,625,779 | 4/1997 | Solomon et al. | 710/113 |
| 5,659,690 | 8/1997 | Stuber et al. | 395/309 |
| 5,721,839 | 2/1998 | Callison et al. | 395/308 |

OTHER PUBLICATIONS

"DECchip 21052 PCI–to–PCI Bridge Data Sheet", *Digital Equipment Corporation*, Order No.: EC–QHURA–TE, Jun. 1995, pp. (i)–A2.

"PCI Local Bus, PCI to PCI Bridge Architecture Specification", Apr. 5, 1994, pp. (i)–66.

*Primary Examiner*—Ayaz R. Sheikh
*Assistant Examiner*—Frantz Blanchard Jean

[57] ABSTRACT

A bridge circuit passes digital information between a primary PCI bus and a secondary PCI bus with increased throughput. The PCI busses carry digital information using respective clock signals having a known minimum skew therebetween. The interface bridge circuit includes primary and secondary PCI bus interfaces configured and arranged to communicate with the primary and secondary PCI busses respectively, and a memory buffer configured and arranged to store the digital information and to be accessed by the primary and secondary PCI bus interfaces. Further, a programmable configuration register is configurable in response to digital configure information received from the primary bus, and is adapted to provide an enable signal to one of the primary PCI bus interface and the secondary PCI bus interface. The enable signal indicates that the digital information is ready in the memory buffer for access by the one of the primary PCI bus interface and the secondary PCI bus interface.

21 Claims, 9 Drawing Sheets

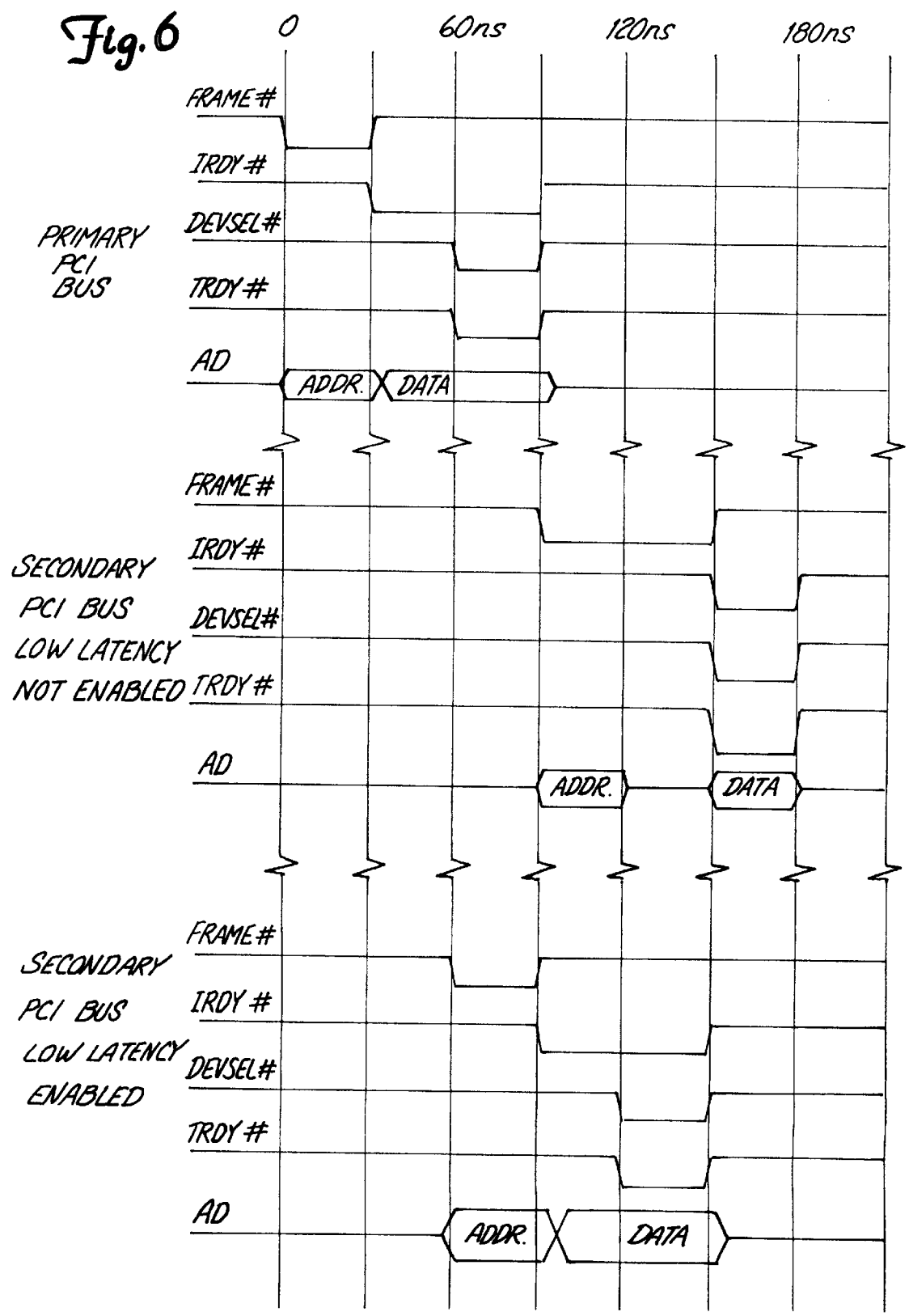

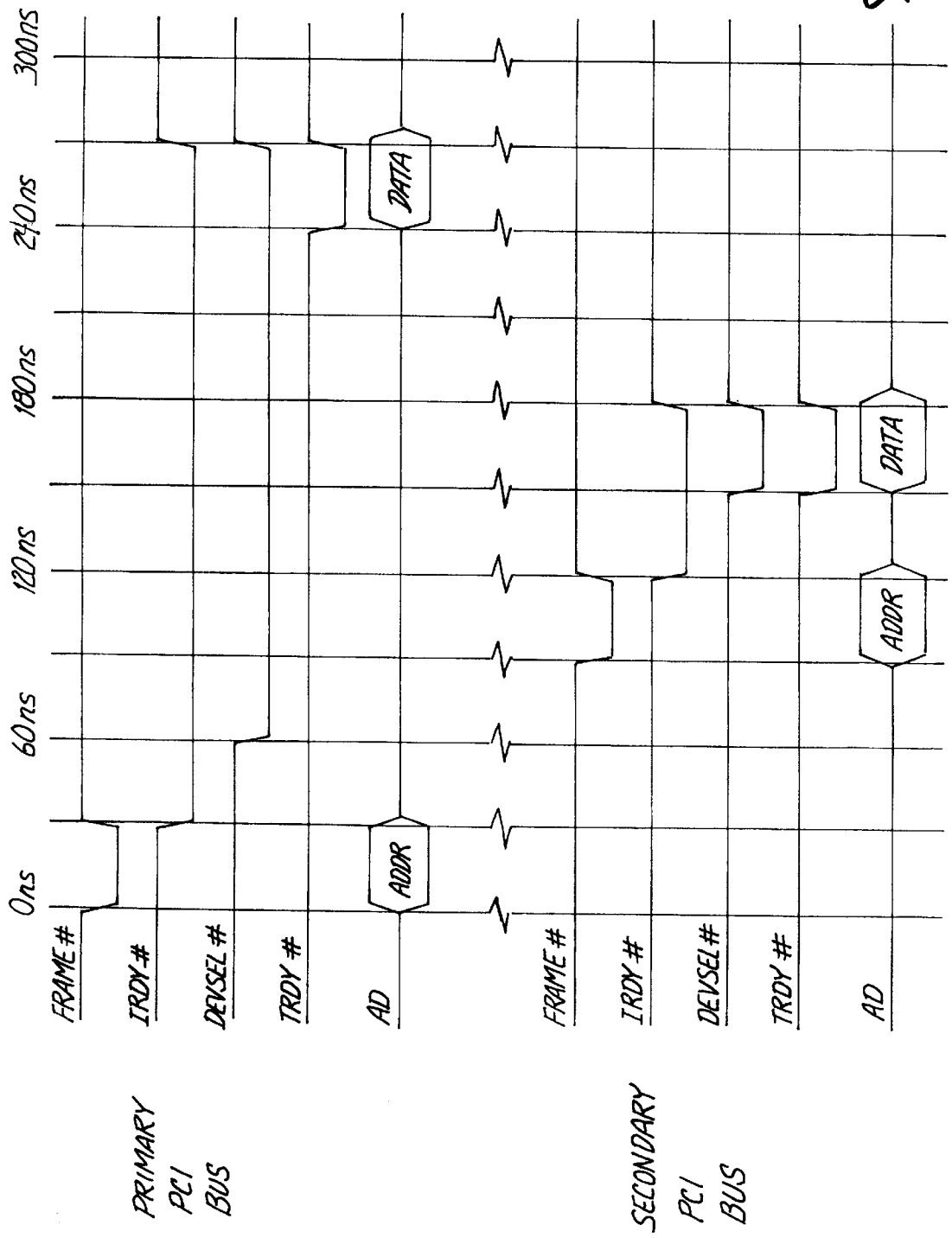

5,978,878

SELECTIVE LATENCY REDUCTION IN BRIDGE CIRCUIT BETWEEN TWO BUSSES

FIELD OF THE INVENTION

The present invention relates generally to information transfer between computers. More particularly, this invention relates to a reduced latency bridge chip for providing data transfer between computer busses, such as Peripheral Component Interface (PCI) busses.

BACKGROUND OF THE INVENTION

The Peripheral Component Interface (PCI) bus was developed as a high speed I/O bus alternative to the Industry Standard Architecture (ISA) I/O bus commonly used in IBM PC-compatible personal computer systems. The I/O bus links peripherals, including disk drives, video screens, network cards, to a host bus, where the host bus links the central processor unit and the memory, usually random access memory. Due to its higher information handling rate than the ISA bus, the PCI bus is particularly useful in situations where there are large amounts of data to be transferred, such as Super VGA images and graphically based operating systems like WINDOWS®. The PCI bus has a clock rate of 33 MHz and uses a 32 bit word, in contrast to the 16 bit word of the ISA which operates at 8 MHz. Thus, the data handling capabilities of the PCI bus are significantly improved over the ISA bus.

As computer applications become increasingly more sophisticated, and video screens increase in resolution, the data throughput of computers continues to increase. It is therefore important to accommodate this increase in the context of data throughput in I/O busses which interface with computers.

One area of concern in limiting the data throughput of a PCI bus system is the bridge spanning between two PCI busses. Commonly, a PCI to PCI bridge includes a first-in-first-out register which receives information from a first PCI bus and passes the information over to the second PCI bus. There are various handshake, verification and data transfer procedures which all take time to complete, and which slow down the transfer of data from one bridge to another.

It is important to maintain as high a rate of data transfer over the bridge as possible. Accordingly, there is a need to reduce the time taken to write or read data across a PCI to PCI bridge by implementing improved handshake, verification and data transfer procedures. The invention disclosed herein is directed towards reducing data transfer time across the bridge.

SUMMARY OF THE INVENTION

The present invention is directed to a bus interface bridge for passing digital information between an initiating bus and a target bus where there is a known skew between respective clock signals on the initiating and target busses. The interface bridge comprises an initiating bus interface, a target bus interface, a memory buffer connected between the initiating bus interface and the target bus interface, and a programmable configuration register. The configuration register is configurable in response to digital information decoded on the initiating bus, and is arranged to provide a by-pass enable signal to the target bus interface and/or the initiating bus interface. The by-pass enable signal indicates that digital information is ready in the memory buffer.

The present invention is also directed to a method of reducing latency in the transfer of digital information across a bus to bus bridge. The method includes configuring a programmable configuration register to generate a by-pass enable signal, reading digital information from the initiating bus into a memory buffer on the bridge, and indicating to the target bus that the digital information is ready in the memory buffer in response to the by-pass enable signal.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which:

FIG. 6 illustrates the information transfer timing for a posted write operation, contrasting timing where low latency is enabled with timing where low latency is not enabled;

FIG. 7 is a timing diagram for a read operation where low latency is not enabled.

Figure 1:
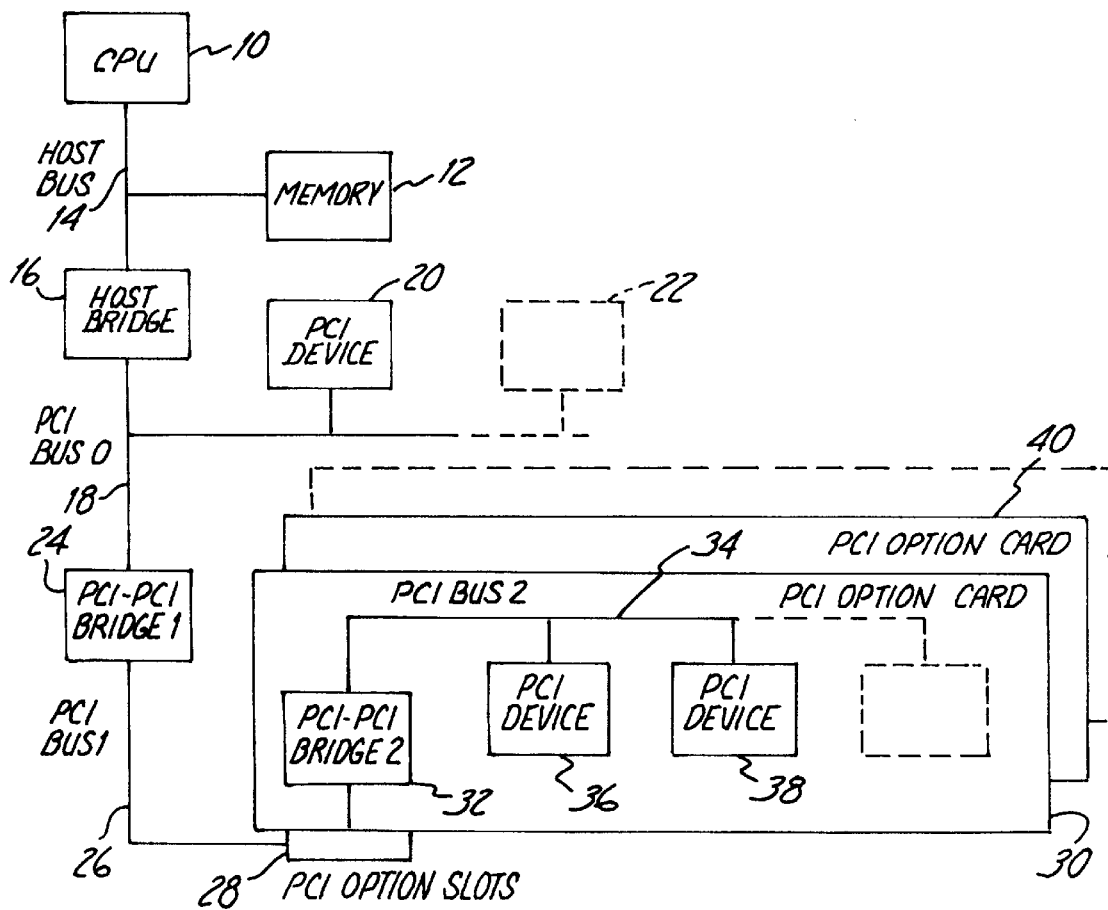
FIG. 1 illustrates a computer-communication arrangement for a PCI bus network including a PCI—PCI bridge constructed in accordance with the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is believed to have application in interfacing a variety of different types of data busses. The present invention has been found to be particularly helpful in reducing the data transfer time over a bridge circuit interfacing two PCI data busses. While the present invention may have many more uses, it is in this PCI context that the present invention is discussed.

Turning now to the drawings, FIG. 1 illustrates a PCI—PCI bridge 24, constructed in accordance with the present invention, in a conventional architecture for information transfer between a CPU and several PCI-communicating peripheral devices 20, 22, 36 and 38, such as disk drives, monitors, keyboards, and other I/O devices in a personal computer environment. A central processing unit (CPU) 10, e.g., an Intel-based 80486 or Pentium-type microprocessor chip, is connected to memory 12, such as random access memory (RAM), via a host bus 14. A host bridge 16 connects the host bus 14 to a first PCI bus 18. The first PCI bus 18 is connected to a first PCI device 20 and, via a first PCI bridge 24, to the second PCI bus 26. The second PCI bus 26 is connected to PCI option slots 28 into which a first PCI option card 30 is inserted. PCI option card 30 contains a second PCI bridge 32 which allows interaction between the second PCI bus 26 and a third PCI bus 34. The third PCI bus 34 supports other PCI devices 36 and 38. Additional PCI option cards 40 may also be inserted in the PCI option slots 28 for connecting additional PCI devices to the CPU 10.

The host bus 14, connecting the CPU 10 and the RAM 12 operates at relatively high data transfer rates, for fast information transfer between the CPU 10 and the RAM 12. The host bridge 16 connecting other devices to the CPU 10 operates at lower speeds. The first PCI bridge 24 permits the optional extension of the PCI network, so that additional PCI devices may be connected to the CPU 10. The first PCI bridge 24 is required to transfer data according to PCI standards, typically 32 bit data words at 33 MHz clock rates. To maintain high throughput, it is important that the PCI bridges 24 and 32 handle data transfers with a large bandwidth. Reduction of bridge latency time during data transfer is therefore desirable in reducing data transfer delays and increasing throughput.

Figure 2A:
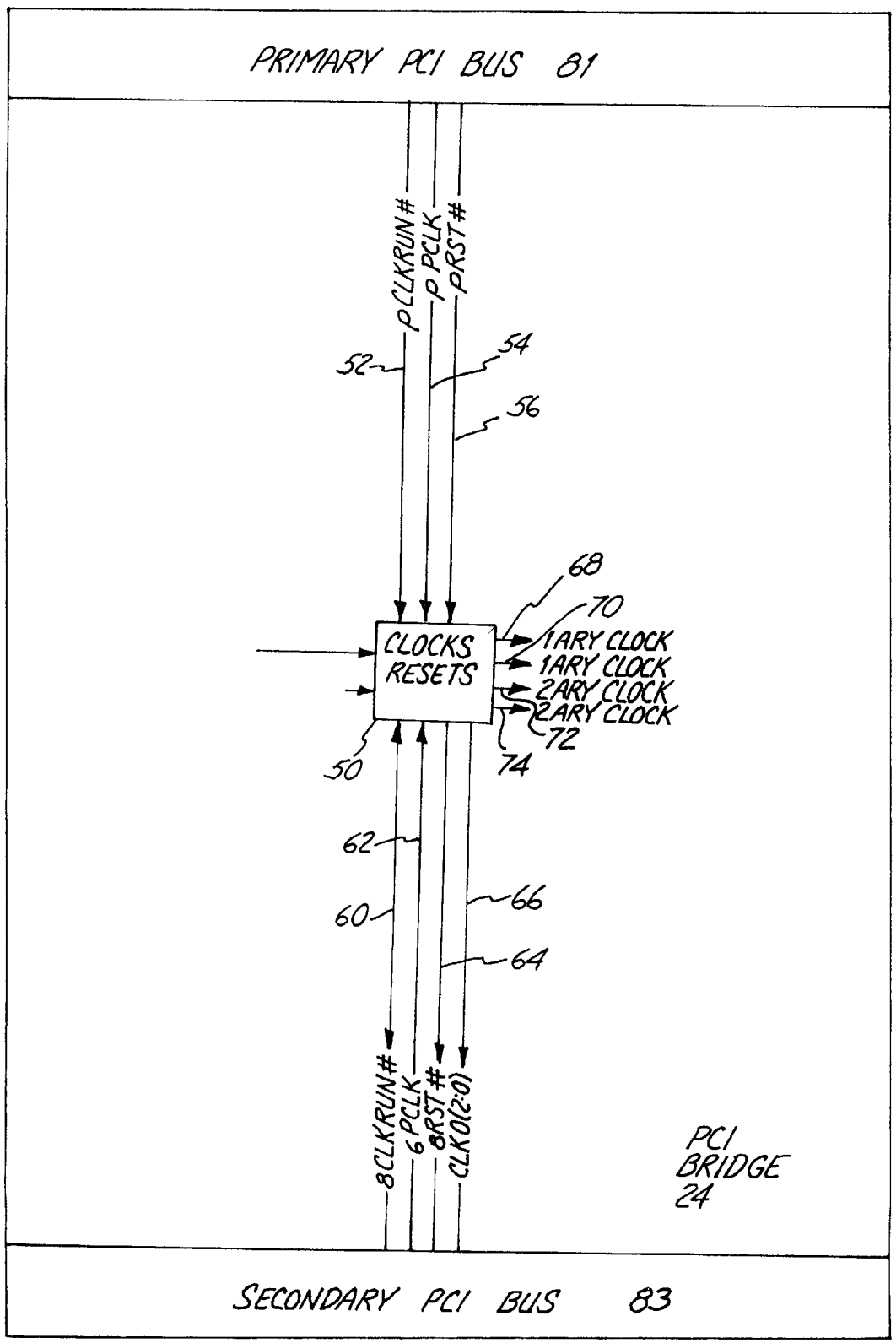
FIG. 2A illustrates the clocks and reset portion of the PCI to PCI bridge chip, according to the present invention.
Figure 2B:
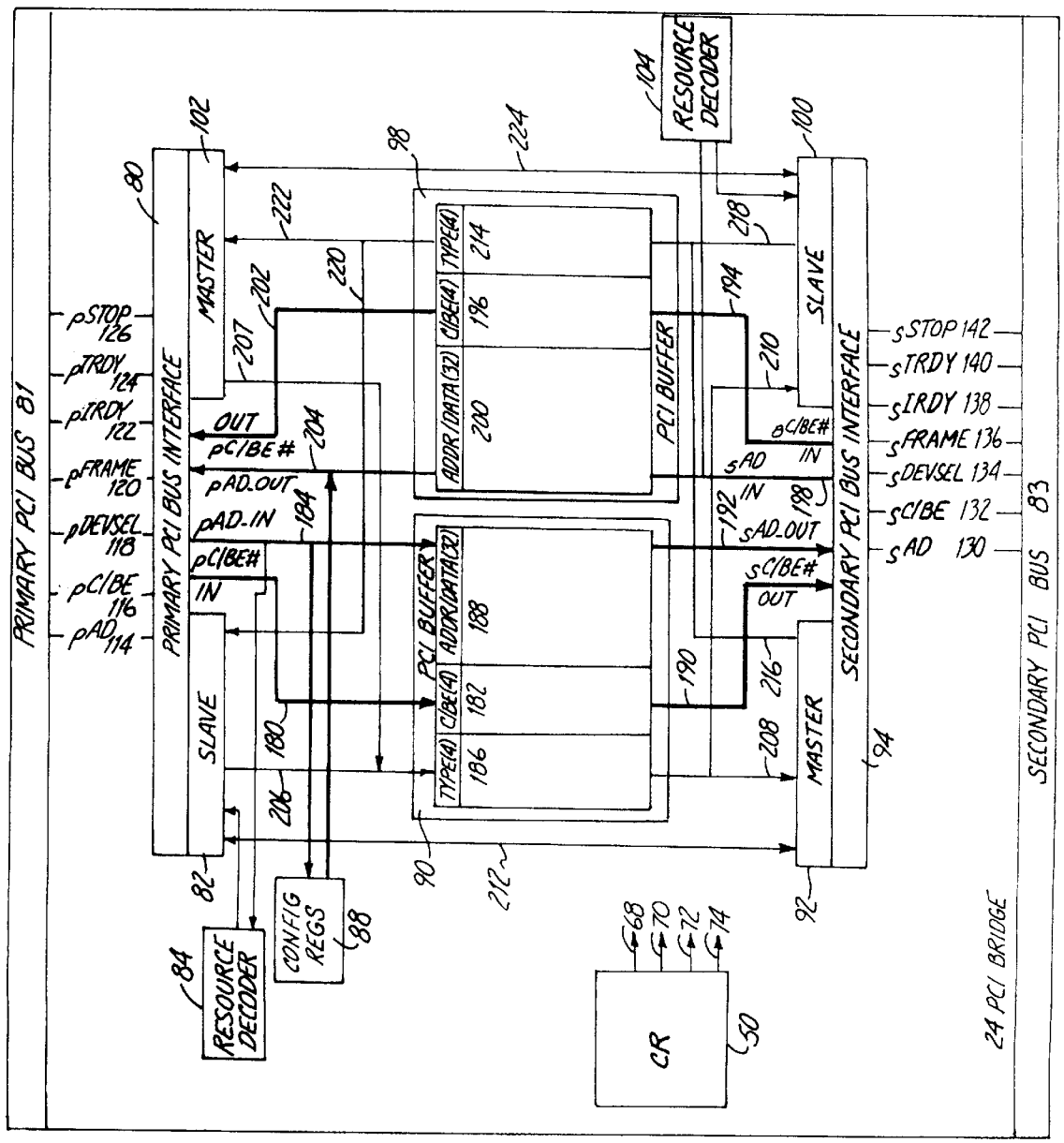
FIG. 2B illustrates the data transfer portion of the PCI to PCI bridge chip in a block form diagram, according to the present invention.

FIGS. 2A and 2B generally illustrate the architecture of the PCI to PCI bridge 24, which is configured to provide synchronization between busses and handle data transfer. Synchronization between busses is provided by a conventional clocks and resets (CR) circuit 50, illustrated in FIG. 2A. The CR circuit 50 receives as inputs a PCLKRUN# signal 52 from the primary, or initiating, PCI bus 81, a primary bridge clock signal pPCLK 54, and primary clock reset signal pRST# 56. On the secondary, or target, side of the chip the CR circuit 50 receives a clock run signal sCLKRUN# 60, a secondary clock signal sPCLK 62, and directs a secondary reset signal sRST# 64 and a clock out signal CLKO 66 out to the secondary PCI bus 83. The CR circuit 50 also directs a primary clock signal 68, a primary reset signal 70, a secondary clock signal 72, and secondary reset signal 74 to the data handling portion of the bridge 28.

The CR circuit 50 allows the PCI bridge chip to operate in three different clock modes. In the first clock mode, the primary clock pPCLK 54 and the secondary clock sPCLK 62 are asynchronous clocks. The PCI bridge chip supports transfer between asynchronously driven PCI busses. In the second clock mode, the clocks of the primary PCI bus and the secondary PCI bus are synchronous, with a limited skew. In the third clock mode, the primary clock signal pPCLK 54 is redriven through the CR chip 50 as the CLKO signal 66. The CLKO signal 66 has two bits, one of which is redirected back into the CR block 50 in sPCLK 62 as the secondary clock input, and the other is used as a secondary clock signal for driving the secondary PCI bus 83. In the third clock mode, there may be a large, but known skew between the clock signals applied to the primary and secondary busses. The reduction in the latency of data transfer described hereinbelow is particularly advantageous when using the latter two applications where there is a known skew between clocks of the primary and secondary PCI busses.

The data transfer portion of the bridge 24, illustrated in FIG. 2B, includes a primary PCI bus interface 80 which is the interface between the bridge 28 and the primary, or initiating, PCI bus 81. The primary PCI bus interface 80 receives and transmits several input and output signals from and to the primary PCI bus 81 during the transfer of digital information from the primary PCI bus 81 to the secondary PCI bus 83. According to standard PCI protocol, the primary PCI bus interface 80 has an associated primary PCI slave 82. The primary PCI slave 82 is responsible for forwarding cycles from the primary bus to the primary-secondary (P-S) PCI buffer 90 and responds to address decode hits from the resource decoder 84.

Included in the input and output signals from the primary PCI bus 81 to the primary PCI bus interface 80 are pAD 114, which includes digital address and data information to be transferred, preferably 32 bits, pC/BE 116 which is the command and byte enable data to be transferred across the bridge, preferably 4 bits, pDEVSEL 118, which is the PCI device select signal, pFRAME 120 which is the initiation signal for data transfer, pIRDY 122 which is an interrupt ready signal indicating that command transfer is ready, pTRDY 124 which is a transfer ready signal indicating that data transfer is ready, and pSTOP 126 which is a stop signal for halting the data transfer process.

In a similar manner, the secondary side of the bridge 24 has several inputs and outputs to the secondary bridge. These include sAD 130, which includes the address and data information be transferred, sC/BE 132, which includes the command and byte enable data to be transferred across the bridge, sDEVSEL 134, which includes the PCI device select signal, sFRAME 136 which is the initiation signal for data transfer, sIRDY 138 which is an interrupt ready signal indicating that command transfer is ready, sTRDY 140 which is a transfer ready signal indicating that data transfer is ready, and sSTOP 142 which is a stop signal for halting the data transfer process.

Figure 3:
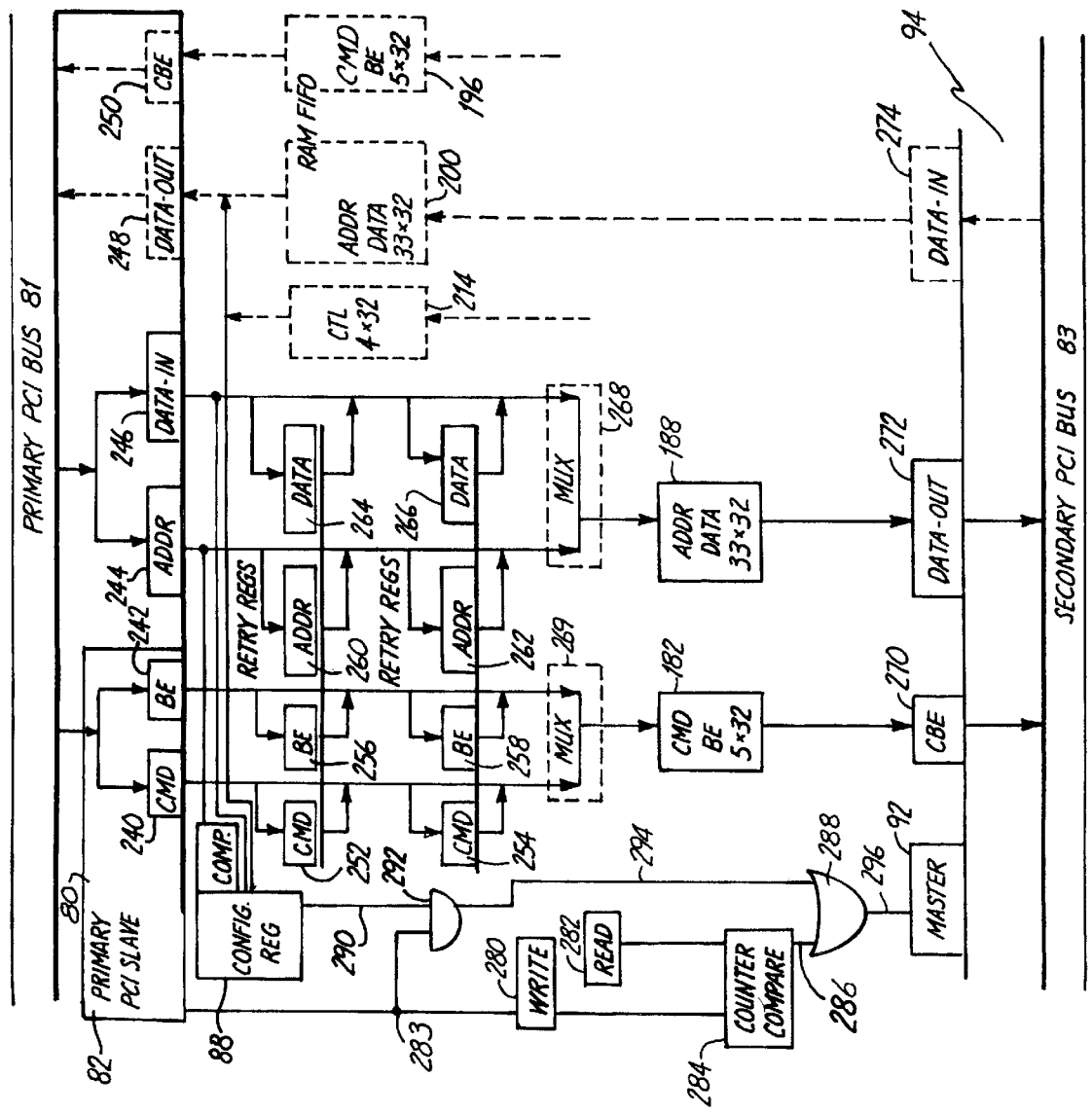
FIG. 3 illustrates specific configuration and data transfer architecture for the PCI to PCI bridge chip, according to the present invention.

Digital information flows along three paths which are addressed below. In the simplified flow illustrated from the primary PCI bus interface 80 to the secondary PCI bus interface 94, the command and byte enable data, pC/BE#_in 180 is transferred from the primary PCI bus interface 80 to the C/BE buffer 182 in the P-S PCI buffer 90. Address and data information, pAD_in 184 is passed to the address/data buffer 188 in the P-S PCI buffer 90. FIG. 3, discussed hereinbelow, illustrates the flow path for information from the primary PCI bus 81 in greater detail, including buffers and multiplexers which receive the information prior to transfer into the P-S PCI buffer 90. Command/byte enable and address/data information are transferred out of the P-S PCI buffer 90 as sC/BE#_out 190 and sAD_out 192, respectively, to the secondary PCI bus interface 94.

In a symmetrical manner, command, byte enable, address, and data information are transferred from the secondary PCI bus interface 94 through the secondary to primary (S-P) PCI buffer 98 to the primary PCI bus interface 80. Command and byte enable information are transferred from the secondary PCI bus interface 94 as sC/BE#_in 194 to the C/BE buffer 196 in the S-P PCI buffer 98. Address and data information are transferred from the secondary PCI bus interface 94 as sAD_in 198 to the address/data buffer 200 in the S-P PCI buffer 98. The command and byte enable information is transferred out of the S-P PCI buffer 98 to the primary PCI bus interface 80 as pC/BE#_out 202 and the address and data information are transferred to the primary PCI bus interface 80 as pAD_out.

A third data path is illustrated to be from pAD_in 184 to the programmable configuration register 88 and from the programmable configuration register 88 to pAD_out 204. This third path is used for transferring configuration data from the CPU 10 to the programmable configuration register 88 so as to configure the bridge 28 for handling digital information in one of a number of preselectable ways. The CPU 10 may also read the current configuration of the programmable configuration register 88.

In addition to the above data flow paths, there are other control data paths for controlling the PCI bridge 24. Control information is transferred from the primary slave 82 along path 206 and from the primary master 102 along path 207 to the P-S PCI buffer 90, and is stored in a control buffer 186 from where it is transferred to both the secondary master 92 and the secondary slave 100 along paths 208 and 210. Additionally, the primary PCI slave 82 communicates directly with the secondary PCI master 92 through path 212.

In a symmetrical manner, the secondary PCI master 92 and the secondary PCI slave 100 transfer control data to the control buffer 214 in the S-P PCI buffer 98 along paths 216 and 218, respectively. Control data is transferred out of the S-P PCI buffer 98 to the primary PCI slave 82 and the primary PCI master 102 along paths 220 and 222, respectively. In addition, the primary PCI master 102 communicates directly with the secondary PCI slave 100 along path 224.

FIG. 3 illustrates the architecture of one side of the PCI bridge chip in greater detail, showing the circuitry used for transferring information from the primary PCI bus 81 through the primary PCI bus interface 80 to the secondary PCI bus interface 94, for transferring to the secondary PCI bus 83. The primary PCI bus interface 80 includes registers to receive command 240, byte enable 242, address 244 and data-in 246 information from the primary PCI bus 81 for transferring to the P-S PCI buffer 90. The address register 244 and the data-in register 246 are both fed by pAD 114 from the primary PCI bus 81, but only address information is registered in the address register 244 and only data information is registered in the data register 246. Likewise, the command and byte enable registers 240 and 242 are fed by pC/BE 116 from the primary PCI bus 81, but only command information is registered in the command register 240 and only byte enable information is registered in the byte enable register 242. The primary PCI bus interface 80 also includes registers for data out 248 and command and byte enable 250 information for transferring information received from the S-P PCI buffer 98 to the primary PCI bus 81. There are two layers of retry registers for command 252 and 254, byte enable 256 and 258, address 260 and 262, and data 264 and 266 information. A major purpose for the retry registers 252–266 is to assist in enabling the target PCI bus to retry a read from the P-S PCI buffer 90 in the case of a read timeout.

The 32-bit address word from the address retry register 262 and the 32-bit data-in word from the data retry register 266 are multiplexed in the multiplexer 268 before being transferred to the 32-bit address/data buffer 188 in the P-S PCI buffer 90. Likewise, the command and byte enable words from the command and byte enable retry registers 254 and 258 are multiplexed in multiplexer 269 before being transferred into the command/byte enable buffer 182 of the P-S PCI buffer 90.

The output from the C/BE buffer 182 is transferred to the secondary C/BE register 270 on the secondary bus interface 94. The address and data information are passed from the address/data buffer 188 to the data-out register 272 on the target bus interface.

Another important aspect of the invention is that the bridge 24 is provided with two, symmetrical, information transfer circuits, to enable information transfer in both directions between the primary and secondary busses. An advantage of this is that identical circuits may be used for information transfer in either direction, and the need to design and implement different circuits for each direction may be avoided. There is a set of two banks of retry registers between the secondary interface and the S-P PCI buffer 98, equivalent to retry registers 252 to 266, and a multiplexer for multiplexing data and address information received from the secondary PCI interface 94 and for transferring the multiplexed information into the address and data buffer 200. The secondary PCI bus interface 94 is provided with a data-in buffer 274 for transferring data from the secondary PCI bus to the address buffer 200.

The programmable configuration register 88 is connected to both the address and data-in buffers 244 and 246. A compare circuit 289 in the programmable configuration register compares incoming address information from the address register 244 with the address of the configuration register. When the incoming address information matches the address of the programmable configuration register 88, the programmable configuration register 88 accepts subsequent data from the data-in buffer 246 as new configuration data so as to reconfigure the programmable configuration register 88.

Latency reduction circuitry is included in the bridge 24 for reducing the time taken to transfer digital information from the primary PCI bus 81 to the secondary PCI bus 83. Latency reduction is described further in connection with FIG. 3.

In conventional operation, the secondary PCI bus interface senses that there is information for transfer in the P-S PCI buffer 90 by comparing the primary-to-secondary (P-S) write counter 280 with the primary-to-secondary (P-S) read counter 282. If there is no information in the P-S PCI buffer 90, then the P-S write counter 280 and the P-S read counter 282 both point to the same address in the P-S PCI buffer 90. When information is written to the P-S PCI buffer 90 from the primary PCI bus, the primary PCI slave 82 increments the P-S write counter 280 to point to the newly written information using the write increment signal 283. On the clock cycle following the increment of the P-S write counter 280, the counter compare circuit 284 compares the P-S write counter 280 with the P-S PCI buffer read buffer 282. Upon detecting a difference, a buffer busy signal 286 is generated by the counter compare circuit 284, indicating that there is data ready to be read in the P-S PCI buffer 90. Conventionally, the buffer busy signal is applied directly to the secondary PCI master 92, which then initiates reading information from the P-S PCI buffer 90 to the secondary PCI bus. In the illustrated embodiment, the buffer busy signal 286 from the counter compare circuit 284 is applied as an input to an OR gate 288.

Another important aspect of the illustrated embodiment of FIG. 3 concerns an output of the programmable configuration register 88 referred to as the by-pass enable signal 290. The by-pass enable signal 290 and the write increment signal 283 form the inputs of an AND circuit 292. The output of the AND circuit 292 is a by-pass signal 294. The by-pass signal 294 is a second input to the OR circuit 288. The output from the OR circuit 288 is the data ready signal 296, which is applied to the secondary PCI master 92 and indicates that there is information ready in the P-S PCI buffer for transferring to the secondary PCI bus 83. The data ready signal 296 is logically high when the counter compare circuit 284 calculates that the buffer is busy, or when the by-pass enable signal 290 and the write increment signal 283 are high. The by-pass enable signal 290 is set high at start-up configuration using the programmable configuration register 88 before information is written to the P-S PCI buffer 90, and the write increment signal 283 is set on the clock cycle following the clock cycle where the information is written. Thus, the by-pass signal 294 is generated during the same clock cycle the data is written into the P-S PCI buffer 90, whereas the counter compare circuit 284 generates the buffer busy signal 286 on the clock cycle following the clock cycle when information is written into the P-S PCI buffer. The secondary PCI master 92 is, therefore, enabled to read information from the P-S PCI buffer 90 before the counter compare circuit 284 has established that there is information in the P-S PCI buffer 90 ready to be written to the secondary PCI bus. The secondary PCI master 92 may read information from the P-S PCI buffer 90 in the same clock cycle as information is written in, if there is sufficient time for the write and read operations. The requirements on the timing of the process are discussed hereinbelow. Since the bridge 28 is symmetrical, by-pass circuitry also exists for the secondary to primary data flow path, as is described hereinbelow.

Figure 4:
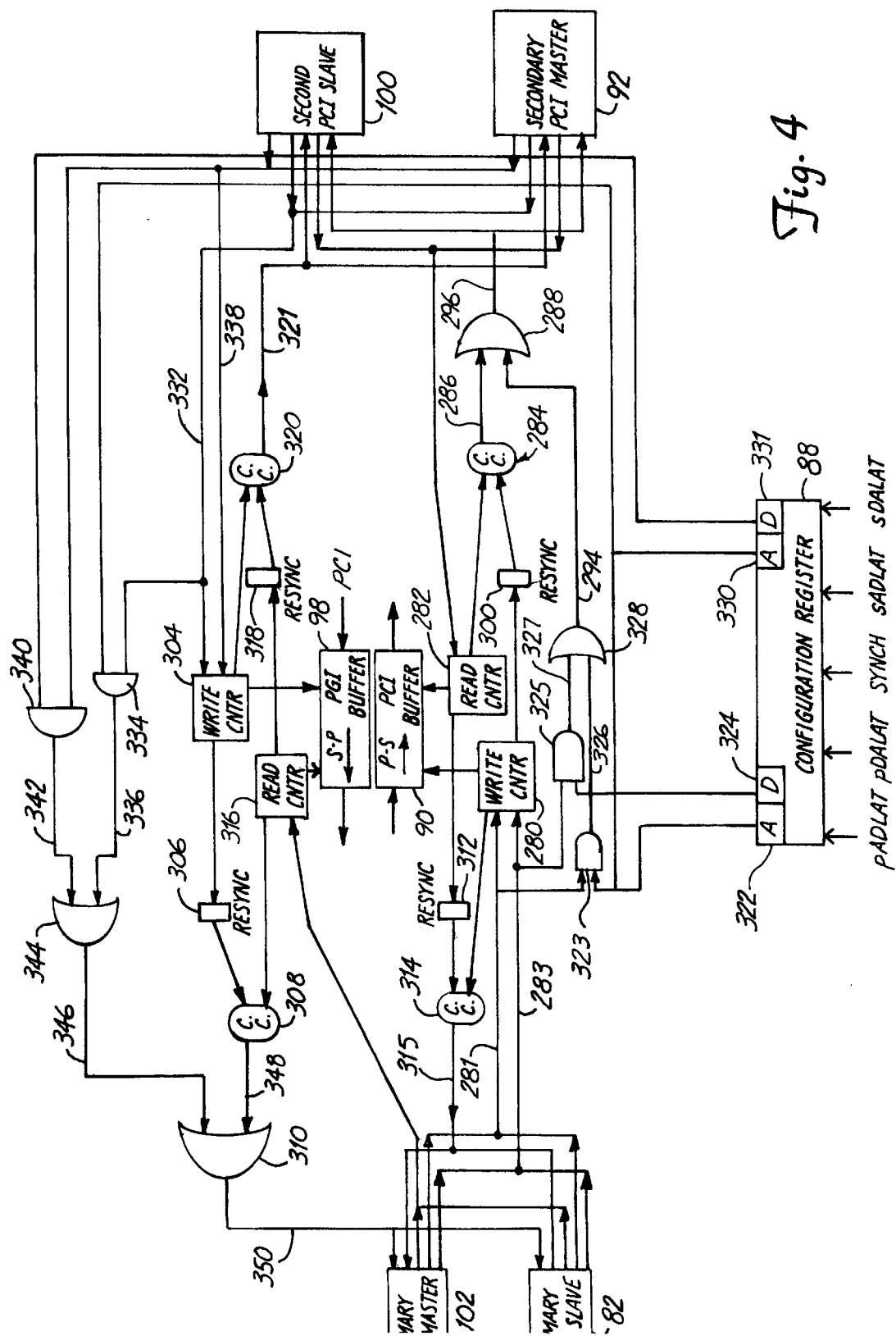
FIG. 4 illustrates a read-write control circuit within the PCI bridge chip, according to a first embodiment of the present invention.

Latency reduction control of the PCI bridge chip is described in greater detail connection with FIG. 4, which illustrates read-write control of the P-S and S-P PCI buffers 90 and 98.

The P-S write counter 280 is incremented by the primary PCI slave 82 whenever the primary PCI slave 82 places address and command information or data and byte enable information into the P-S PCI buffer 90. In addition, the primary PCI master 102 increments the P-S write counter 280 whenever the primary PCI master 102 receives read data or status. The write counter 280 is incremented by the address increment signal 281 when address information is written to the P-S PCI buffer 90, and by the data increment signal 283 when data information is written. The P-S read counter 282 is incremented by the secondary PCI master 92 whenever it receives address and command information or data and byte enable information from the P-S PCI buffer 90. In addition, the secondary PCI slave 100 increments the P-S read counter 282 whenever the secondary PCI slave 100 receives read data or status from the P-S PCI buffer 90.

The value of the P-S write counter 280 is passed to the counter compare circuit 284 ("C.C.") via a resynchronizer 300. The resynchronizer 300 resynchronizes the signal from the P-S write counter 280 if the clocks of the primary and secondary busses are asynchronous (first clock mode). If the clocks are synchronous (second clock mode), or if the primary clock is used to drive the secondary clock (third clock mode), then the skew between clocks is constant and the resynchronizer 300 has no effect on the relative timing of the signal from the P-S write counter 280 to the counter compare circuit 284. The counter compare circuit generates the buffer busy signal 286 whenever it detects that the P-S read counter 286 and P-S write counter 280 are different.

The second counter compare circuit 314 is used to stop information being written to the P-S PCI buffer 90 when the P-S PCI buffer 90 no longer has memory to accept more information. The second counter compare circuit 314 compares the value of the P-S write counter 280 with the value of the P-S read counter 282 after the read counter value has been resynchronized to the primary clock, if necessary, in the second resynchronizer 312. Whenever the difference in write counter value and read counter value reaches a large value, preferably 28, the second counter compare circuit 314 asserts a Ram_stop signal 315 on the primary PCI slave and master 82 and 102. The Ram_stop signal 315 signals a disconnect in the middle of a sequence or forces a retry to any new request when the difference in write and read counter values is 28 or more. Once the difference in write and read values falls below 28, Ram_stop is de-asserted and information transfer may recommence.

Address information requires to be decoded in a single clock by the resource decoder 84 before the information is ready to be passed across the P-S PCI buffer 90. Data information does not need to be decoded by the resource decoder 84 before passing across the P-S PCI buffer 90, since the address is already set. Thus, data information is typically ready in the P-S PCI buffer 90 at an earlier stage in a clock cycle than is address information. Another important aspect of the invention is that the programmable configuration register 88 is provided with the ability to independently select the by-pass configuration, alternatively known as the low latency configuration, for data and address information. The PCI bridge 28 also allows for the by-pass feature in data transfer in either direction.

The inputs to the programmable configuration register 88 include the configuration bits pADLAT, pDALAT, sADLAT and sDALAT. The bit pADLAT enables low latency transfer of address information from the primary PCI bus 81 to the secondary PCI bus 83. The bit pDALAT enables low latency transfer of data information from the primary PCI bus 81 to the secondary PCI bus 83. The bit sADLAT enables low latency transfer of address information from the secondary PCI bus 83 to the primary PCI bus 81, and the bit sDALAT enables low latency transfer of data information from the secondary PCI bus 83 to the primary PCI bus 81.

Another important aspect of the invention is low latency transfer of information from the primary side to the secondary side. The programmable configuration register 88 generates two outputs for turning on low latency primary to secondary transfer. These are the primary to secondary address low latency output 322 and the primary to secondary data low latency output 324. Whenever one of these outputs 322 and 324 is high, low latency is enabled for passing information through the PCI bridge 28. The primary to secondary address low latency output 322 is ANDed in address latency AND gate 323 to generate an address latency enable signal 326. The primary to secondary data low latency output 324 is ANDed in data latency AND gate 325 to generate a data latency enable signal 327. The address and data latency enable signals are ORed in the latency enable OR gate 328 to generate the by-pass signal 294. The by-pass signal 294 and the buffer busy signal 286 are input to the OR gate 288 to generate the data ready signal 296 which is then passed to the secondary PCI master 92 and the secondary PCI slave 100, to indicate that information is ready in the P-S PCI buffer 90. Thus the secondary side of the bridge 24 is advantageously informed that data is ready in the P-S PCI buffer 90 when latency is enabled in the programmable configuration register 88 for either address or data information.

Since the PCI bridge 24 is symmetrically arranged for information transfer, there is a similar arrangement for implementing low latency information transfer from the secondary side to the primary side.

The programmable configuration register 88 generates the secondary to primary address low latency output 330 and the secondary to primary data low latency output 331. The secondary to primary address low latency output 330 is ANDed with the secondary to primary address write counter increment signal 332 in the secondary address AND gate 334 to generate the secondary address latency enable signal 336. Similarly, the secondary to primary data low latency output 331 is ANDed with the secondary to primary data write counter increment signal 338 in the secondary data AND gate 340 to generate the secondary data latency enable signal 342. The secondary address and data latency enable signals 336 and 342 are ORed in the secondary latency enable OR gate 344 to generate the secondary by-pass signal 346. The secondary by-pass signal 346 and the secondary buffer busy signal 348 are input to the secondary OR gate 310 to generate the secondary data ready signal 350 which is then passed to the primary PCI master 102 and the primary PCI slave 82 to indicate that information is ready in the S-P PCI buffer 98. Thus the primary side of the bridge 24 is advantageously informed that data is ready in the S-P PCI buffer 98 when latency is enabled in the programmable configuration register 88 for either address or data information.

Figure 5A:
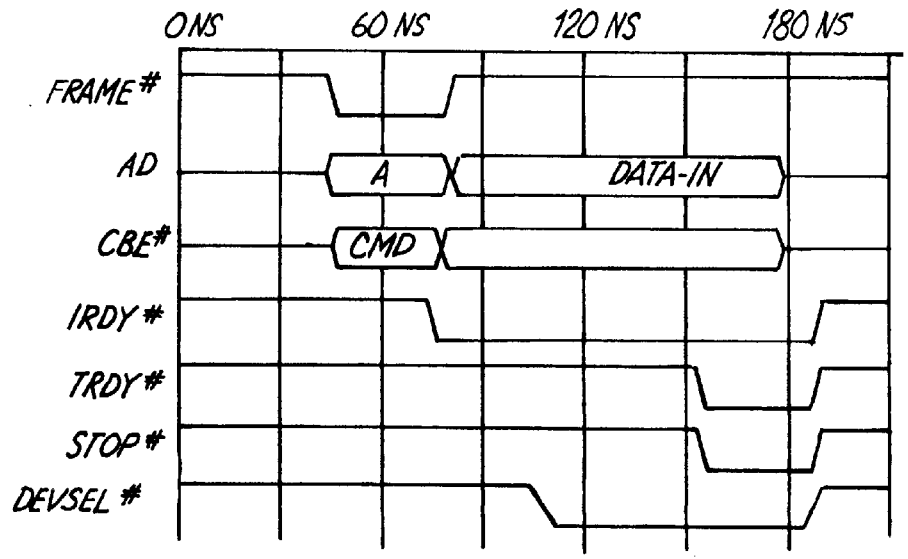
FIGS. 5A and 5B illustrate the timing for respective configuration write and read cycles.
Figure 5B:
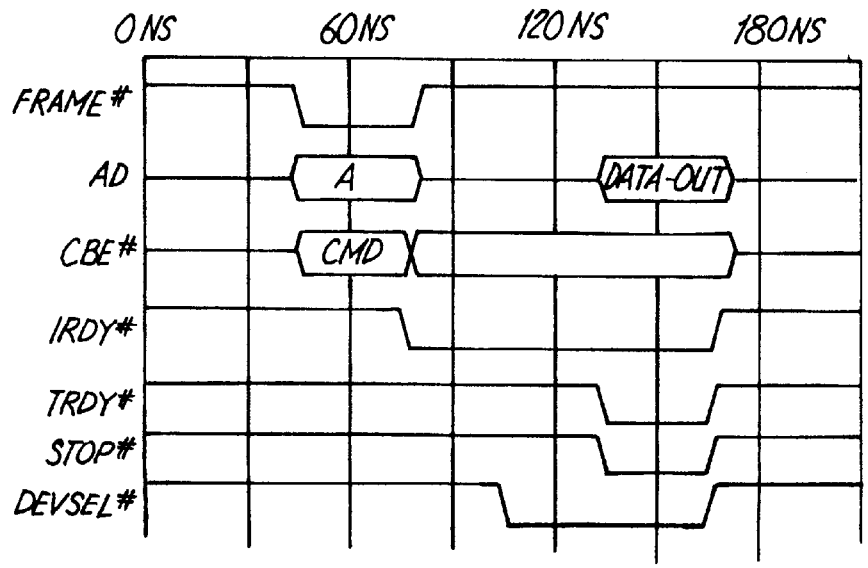

FIGS. 5A and 5B illustrate timing diagrams for write and read cycles for the programmable configuration register 88. A clock rate of 33 MHz is assumed, corresponding to a clock period of ~30 nanoseconds. The primary PCI bus 81 is assumed to be connected to a medium responder device. DEVSEL# is asserted two clock cycles after FRAME# when the connected device is a medium responder. With reference to the configuration write cycle illustrated in FIG. 5A, FRAME# is asserted on pFRAME 120 by the primary PCI bus 81 for one clock cycle to start the bus cycle. Upon assertion of FRAME#, address information AD is written on pAD 114 to the address/data buffer 188 of the P-S PCI buffer 90 and to the programmable configuration register 88. Command information CMD is written on pC/BE 116 to the command/byte enable buffer 182 of the P-S PCI buffer 90. Address information AD and command information CMD are written during only one clock cycle. IRDY# is asserted on pIRDY 122 one clock cycle after FRAME#, to indicate that the PCI bridge 24 is able to complete data information transfer. IRDY# is asserted until the end of the transaction. On configuration write cycles, if the bridge 24 is selected during a primary PCI master initiated configuration cycle and the connected device is a medium responder, then the bridge 24 asserts DEVSEL# on pDEVSEL 118 two clock cycles after the assertion of FRAME#. One clock cycle after the address information has been written, the data information, Data-in, is written on pAD 114. Data is strobed into the programmable configuration register 88 after the second clock cycle after IRDY# is asserted. TRDY# is asserted on pTRDY 122 three clock cycles after IRDY# is asserted. STOP# is asserted on pSTOP 126 with TRDY# to terminate data transfer. Typically, STOP# may also abort and retry data transfer, if DEVSEL# and TRDY# are not both asserted when STOP# is asserted.

With reference to the configuration read cycle illustrated in FIG. 5B, address and command information are received in the same first clock cycle as FRAME# is asserted. IRDY# is asserted one cycle after FRAME# and indicates that the initiating side is ready to receive the read. The requested configuration register data, Data-out, is driven onto AD. TRDY# is asserted three clock cycles after FRAME#.

Timing diagrams for transfer of information across the bridge 28 are illustrated in FIG. 6, which shows timing for a single data transfer for a posted write and compares the data transfer time when low latency is not enabled with when low latency is enabled. It is assumed that the posted write is being made to a medium responder and that the clock rate is 33 MHz. The upper portion of FIG. 6 illustrates timing on the primary PCI bus 81 when writing to the secondary PCI bus 83. FRAME# is asserted on pFRAME 120 by the primary PCI bus 81 for one clock cycle to initiate the bus transfer routine. Address information is written on pAD 114 into the P-S PCI buffer 90 during the clock cycle when FRAME# is asserted. IRDY# is asserted on pIRDY 122 one clock cycle after FRAME#, to indicate that the PCI bridge 28 is able to complete data information transfer. IRDY# is asserted until the end of the transaction on the primary side. Data information is written on pAD 114 to the address/data buffer 188 in the P-S PCI buffer 90 during the clock cycle immediately following the address writing cycle. Since it is assumed that the device on the primary side is a medium responder, DEVSEL# is asserted on pDEVSEL 118 one clock cycle after the assertion of IRDY#. DEVSEL# is assertable one clock cycle earlier when the device on the primary side is a fast responder, or one clock cycle later when the device on the primary side is a slow responder. TRDY# is asserted on pTRDY 124 one clock cycle after IRDY# is asserted. The assertion of data on pAD 114 is stopped within one clock period of TRDY# being asserted.

When there is no low latency in the bridge 28, the timing of signals on the secondary PCI bus 83 is as shown in the center portion of FIG. 6. FRAME# is asserted on sFRAME 136 when the data ready signal 296 is asserted on the secondary PCI master 92. In the case where low latency is not enabled, FRAME# is asserted after the P-S write counter 280 has incremented to generate a data ready signal 296. The P-S write counter 280 is incremented at a time following the first complete clock cycle when data is asserted on pAD 114. The address information is written to the secondary PCI bus 83 on sAD 130 when FRAME# is asserted on sFRAME 136. FRAME# is asserted on sFRAME 136. Since the responding device is assumed to be a medium responder, FRAME# is asserted for two clock cycles, at which point IRDY# is asserted on sIRDY 138, DEVSEL# is asserted on sDEVSEL 134 and TRDY# is asserted on sTRDY 140. When the responding device is a fast responder, DEVSEL# may be asserted one clock cycle earlier, or one clock cycle later if the device is a slow responder.

When low latency is enabled, as shown in the lower portion of FIG. 6, the data ready signal 296 is produced when data is read into the address/data buffer 188, a clock cycle earlier than when low latency is not enabled. Thus FRAME# is asserted on sFRAME 136 within one clock cycle or less of data being read into the address/data buffer 188, which is one clock cycle earlier than in the case where low latency was not enabled. FRAME# is asserted on sFRAME 134 for one clock cycle. The address information is written out from the address/data buffer 188 when FRAME# is asserted on sFRAME 136. IRDY# is then asserted on sIRDY 138 on the clock cycle following the assertion of FRAME# on sFRAME 136, allowing data to be written from the address/data buffer 188 immediately following the writing of address information. During the cycle after IRDY# is asserted, DEVSEL# and TRDY# are asserted on sDEVSEL 134 and sTRDY 140 respectively, to close out the cycle. Thus, for posted writes, the bridge 24 may complete data transfer from the primary PCI bus 81 to the secondary PCI bus 83 one clock cycle earlier then when low latency is not enabled. The reduction in data transfer time does not depend on the speed of the responder on the secondary side.

Timing diagrams are shown in FIG. 7 for a read cycle, single data transfer where there is no low latency capability according to the present invention. It is assumed that the clock runs at 33 MHz and that the primary PCI bus 81 is connected to a medium responder, and that responding device on the secondary PCI bus 83 is a medium responder.

FRAME# is asserted on pFRAME 120 by the primary PCI bus 81 for one clock cycle to initiate the read cycle.

Address information is written on pAD 114 into the P-S PCI buffer 90 during the clock cycle when FRAME# is asserted. IRDY# is asserted on pIRDY 122 one clock cycle after FRAME#, to indicate that the PCI bridge 24 is able to complete data information transfer. IRDY# is asserted until the end of the transaction on the primary side. DEVSEL# is asserted on pDEVSEL 118 one clock cycle after the assertion of IRDY#. The P-S write counter 280 is incremented after the address information is been presented on pAD 114. Increment of the P-S write counter 280 is detected by the counter compare circuit 284 in the clock cycle following increment of the P-S write counter 280. The counter compare circuit 284 generates the buffer busy signal 286 which, in turn, generates the data ready signal 296 which is transmitted to the secondary PCI master 92. Thus, the secondary PCI master 92 is informed that there is information in the P-S PCI buffer more than one clock cycle after the P-S write counter 280 is incremented.

FRAME# is asserted on sFRAME 136 at the beginning of the clock cycle following receipt of the data ready signal by the secondary PCI master 92. FRAME# is asserted on sFRAME 136 for one clock cycle. The address information is presented on sAD 130 to the secondary PCI bus 83 simultaneously with FRAME# on sFRAME 136. IRDY# is asserted on sIRDY 138 one clock cycle after FRAME# is asserted. One clock cycle after the assertion of IRDY# on sIRDY 138, data is presented on sAD 130 to the address/data buffer 200 of the S-P PCI buffer 98, and DEVSEL# and TRDY# are asserted on sDEVSEL 134, and sTRDY 140 respectively. The S-P write counter 304 is incremented after the data information has been presented on sAD 130. Increment of the S-P write counter 304 is detected by the counter compare circuit 308 in the clock cycle following increment of the S-P write counter 304. The counter compare circuit 308 generates the buffer busy signal 348 which, in turn, generates the data ready signal 350 transmitted to the primary PCI master 102. Thus, the primary PCI master 102 is informed that there is information in the S-P PCI buffer 98 more than one clock cycle after the S-P write counter 304 is incremented. TRDY# is asserted on pTRDY 124 at the beginning of the clock cycle following receipt of the data ready signal 350 by the primary PCI master 102. The data is presented on pAD 114 along with TRDY# on pTRDY 124. The read cycle closes out the following clock cycle with IRDY#, DEVSEL#, and TRDY# being de-asserted from pIRDY 122, pDEVSEL 118, and pTRDY 124 respectively. In the read cycle just described, the requested data is returned eight clock cycles after the read cycle was initiated.

Figure 8:
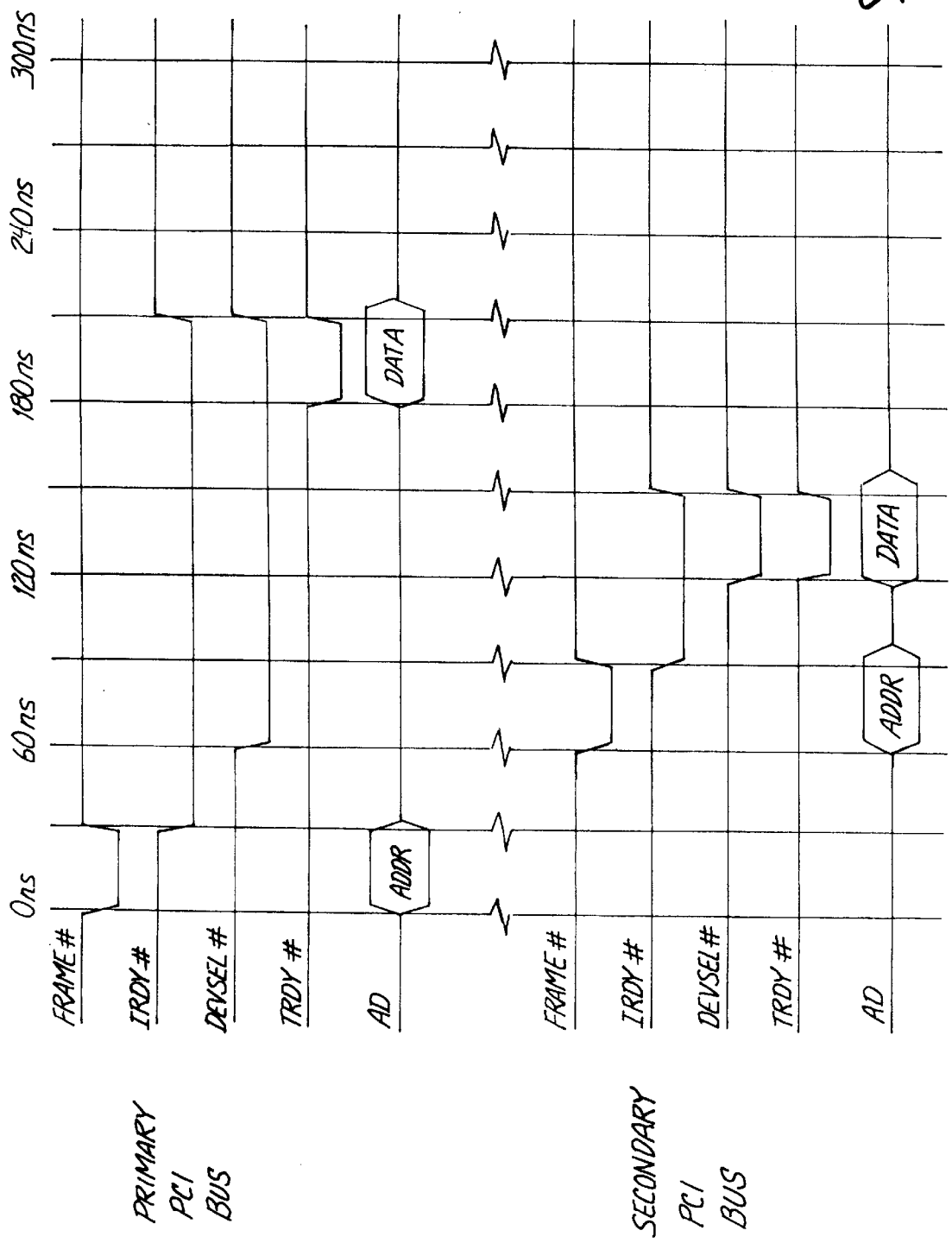
FIG. 8 is a timing diagram for a read operation where low latency is enabled.

Timing diagrams are shown in FIG. 8 for a read cycle, single data transfer using the same assumptions as made for the transfer illustrated in FIG. 7, but where low latency according to the present invention is enabled. FRAME# is asserted on pFRAME 120 by the primary PCI bus 81 for one clock cycle to initiate the read cycle. Address information is written on pAD 114 into the P-S PCI buffer 90 during the clock cycle when FRAME# is asserted. IRDY# is asserted on pIRDY 122 one clock cycle after FRAME#, to indicate that the PCI bridge 28 is able to complete data information transfer. IRDY# is asserted until the end of the transaction on the primary side. DEVSEL# is asserted on pDEVSEL 118 one clock cycle after the assertion of IRDY#. The P-S write counter 280 is incremented after the address information is been presented on pAD 114. Increment of the P-S write counter 280 generates the bypass signal 294 which, in turn, generates the data ready signal 296. Thus, the secondary PCI master 92 may be informed that there is information in the P-S PCI buffer during the same clock cycle as the P-S write counter 280 is incremented.

FRAME# is asserted on sFRAME 136 at the beginning of the clock cycle following receipt of the data ready signal 296 by the secondary PCI master 92. FRAME# is asserted on sFRAME 136 for one clock cycle. The address information is presented on sAD 130 to the secondary PCI bus 83 simultaneously with FRAME# on sFRAME 136. IRDY# is asserted on sIRDY 138 one clock cycle after FRAME# is asserted. One clock cycle after the assertion of IRDY# on sIRDY 138, data is presented on sAD 130 to the address/data buffer 200 of the S-P PCI buffer 98, and DEVSEL# and TRDY# are asserted on sDEVSEL 134, and sTRDY 140 respectively. The S-P write counter 304 is incremented after the data information is presented on sAD 130. Increment of the S-P write counter 304 generates the bypass signal 346 which, in turn, generates the data ready signal 350. Thus, the primary PCI master 102 is informed that there is information in the S-P PCI buffer 98 during the same clock cycle as the S-P write counter 304 is incremented. TRDY# is asserted on pTRDY 124 at the beginning of the clock cycle following receipt of the data ready signal 350 by the primary PCI master 102. The data is presented on pAD 114 along with TRDY# on pTRDY 124. The read cycle closes out the following clock cycle with IRDY#, DEVSEL#, and TRDY# being de-asserted from pIRDY 122, pDEVSEL 118, and pTRDY 124 respectively. In the low latency read cycle, the requested data is returned six clock cycles after the read cycle was initiated, rather than eight as was described for the read cycle without low latency, giving a reduction in read time of two clock cycles. A similar reduction in read time is afforded by the low latency read cycle when the device on the secondary side is either a fast responder or a slow responder.

Accordingly, a PCI to PCI bridge has been described which enables transfer of information across the bridge at higher data rates than is obtained using conventional PCI bridge architecture. The increased data rate is achieved by selectively reducing latency in the bridge chip for address and for data information. The reduction in transaction time resulting from the reduced latency circuit is not affected when the responding device is either a slow or a fast responder.

Other embodiments of the invention will be apparent to those skilled in the art from consideration of the specification and practice of the invention disclosed herein. It is intended that these embodiments be considered as exemplary only, with a true scope and spirit of the invention being indicated by the following claims.

What is claimed is:

1. A bus interface bridge circuit for passing digital information between a primary bus and a secondary bus, the interface bridge circuit comprising:

a primary bus interface configured and arranged to communicate with the primary bus;

a secondary bus interface configured and arranged to communicate with the secondary bus;

a memory buffer configured and arranged to store the digital information and to be accessed by the primary bus interface and the secondary bus interface;

a programmable configuration register, configurable in response to digital configure information received from the primary bus, and adapted to provide an enable signal to one of the primary bus interface and the secondary bus interface, the enable signal indicating that the digital information is ready in the memory buffer for access by the one of the primary bus interface and the secondary bus interface, and further adapted to provide a by-pass enable output for at least one of address and data information; and a logic circuit adapted to generate a by-pass enable signal for communication of address and data information in response to the by-pass enable output and a counter increment output from the other of the primary and secondary bus interfaces.

2. The bus interface bridge circuit of claim 1, wherein the programmable configuration register is adapted to provide a first enable signal to the primary bus interface and a second enable signal to the secondary bus interface, each of the first and second enable signals indicating that the digital information is ready in the memory buffer for access by a respective one of the primary bus interface and the secondary bus interface.

3. The bus interface bridge circuit of claim 1, wherein the programmable configuration register comprises an input selectable in response to whether the digital information is address information or data information.

4. The bus interface bridge circuit of claim 1, wherein the programmable configuration register comprises an enable signal output to selectively indicate whether the digital information is address information or data information.

5. The bus interface bridge circuit of claim 4, wherein the programmable configuration register is adapted to provide a first enable signal to the primary bus interface and a second enable signal to the secondary bus interface, the first and second enable signals being independently selectable in response to whether the digital information is address information or data information.

6. The bus interface bridge circuit of claim 1, further comprising:
   a first read counter configured to indicate a read address in the memory buffer;
   a first write counter configured to receive a write increment signal from the other of the primary bus interface and the secondary bus interface and to indicate a write address in the memory buffer;
   a compare circuit configured to compare the read address with the write address and to generate a buffer busy signal when the read address is not equal to the write address;
   a first logical circuit configured to generate a by-pass signal in response to the enable signal and the write increment signal; and
   a second logical circuit configured to transmit a data ready signal to the one of the primary bus interface and the secondary bus interface in response to the buffer busy signal and the by-pass signal.

7. A bus interface bridge circuit for passing digital information between a primary bus and a secondary bus, the busses carrying digital information using respective clock signals having a known minimum skew therebetween, the interface bridge circuit comprising:
   a primary bus interface configured and arranged to communicate with the primary bus;
   a secondary bus interface configured and arranged to communicate with the secondary bus;
   a memory buffer configured and arranged to store the digital information and to be accessed by the primary bus interface and the secondary bus interface;
   programmable configuration register, configurable in response to digital configure information received from the primary bus, and adapted to provide an enable signal to one of the primary bus interface and the secondary bus interface, the enable signal indicating that the digital information is ready in the memory buffer for access by the one of the primary bus interface and the secondary bus interface, wherein the programmable configuration register comprises an address by-pass enable output and a data by-pass enable output, the other of the primary bus interface and the secondary bus interface comprises an address write counter increment output and a data write counter increment output; and
   a logic circuit adapted to generate the by-pass signal in response to either the address by-pass enable output and the address write counter increment or the data by-pass enable output and the data write counter increment.

8. A method for reducing latency in a bridge circuit between a primary bus and a secondary bus, the busses carrying digital information using respective clock signals having a known minimum skew therebetween, the method comprising:
   configuring a programmable configuration register to generate a first by-pass enable signal;
   reading digital information from one of the primary bus and secondary bus into a memory buffer on the bridge; and
   indicating in response to the first by-pass enable signal to the other of the primary bus and the secondary bus that the digital information is ready in the memory buffer;
   configuring the programmable configuration register to generate an address by-pass enable signal and a data by-pass enable signal;
   generating an address write counter increment signal when address information is read into the memory buffer and a data write counter increment signal when data information is read into the memory buffer; and
   indicating to the other of the primary bus and the secondary bus that the digital information is ready in the memory buffer in response to either the address by-pass enable signal and the address write counter increment signal or the data by-pass enable signal and the data write counter increment signal.

9. A PCI bus system for transferring digital information comprising:
   a central processor unit connected to a host bus;
   a first PCI bus connected to the host bus by a host bridge;
   a second PCI bus, the first and second PCI busses having respective clock signals with a known minimum skew therebetween; and
   a PCI bridge adapted to connect the first PCI bus and the second PCI bus, the PCI bridge comprising
      a first PCI bus interface configured and arranged to communicate with the first PCI bus;
      a second PCI bus interface configured and arranged to communicate with the second PCI bus;
      a memory buffer configured and arranged to store the digital information and to be accessed by the first and second PCI bus interfaces;
      a programmable configuration register, configurable in response to digital configure information received from the central processor unit, and adapted to provide an enable signal to one of the first PCI bus interface and the second PCI bus interface, the enable signal indicating that the digital information is ready in the memory buffer for access by the one of the first PCI bus interface and the second PCI bus interface, and further adapted to provide a by-pass enable output for at least one of address and data information; and a logic circuit adapted to generate a by-pass enable signal for communication of address and data information in response to the by-pass enable output and a counter increment output from the other of the primary and secondary bus interfaces.

10. The PCI bus system of claim 9, wherein the programmable configuration register is adapted to provide a first enable signal to the primary PCI bus interface and a second enable signal to the secondary PCI bus interface, each of the first and second enable signals indicating that the digital information is ready in the memory buffer for access by a respective one of the primary bus interface and the secondary bus interface.

11. The PCI bus system of claim 9, wherein the programmable configuration register comprises an input selectable in response to whether the digital information is address information or data information.

12. The PCI bus system of claim 9, wherein the programmable configuration register comprises an enable signal output to selectively indicate whether the digital information is address information or data information.

13. The PCI bus system of claim 12, wherein the programmable configuration register is adapted to provide a first enable signal to the primary bus interface and a second enable signal to the secondary bus interface, the first and second enable signals being independently selectable in response to whether the digital information is address information or data information.

14. The PCI bus system of claim 9, further comprising:
a first read counter configured to indicate a read address in the memory buffer;
a first write counter configured to receive a write increment signal from the other of the primary PCI bus interface and the secondary PCI bus interface and to indicate a write address in the memory buffer;
a compare circuit configured to compare the read address with the write address and to generate a buffer busy signal when the read address is not equal to the write address;
a first logical circuit configured to generate a by-pass signal in response to the enable signal and the write increment signal; and
a second logical circuit configured to transmit a data ready signal to the one of the primary PCI bus interface and the secondary PCI bus interface in response to the buffer busy signal and the by-pass signal.

15. A PCI bus system for transferring digital information comprising:
a central processor unit connected to a host bus;
a first PCI bus connected to the host bus by a host bridge;
a second PCI bus, the first and second PCI busses having respective clock signals with a known minimum skew therebetween; and
a PCI bridge adapted to connect the first PCI bus and the second PCI bus, the PCI bridge comprising
a first PCI bus interface configured and arranged to communicate with the first PCI bus;
a second PCI bus interface configured and arranged to communicate with the second PCI bus;
a memory buffer configured and arranged to store the digital information and to be accessed by the first and second PCI bus interfaces;
a programmable configuration register, configurable in response to digital configure information received from the central processor unit, and adapted to provide an enable signal to one of the first PCI bus interface and the second PCI bus interface, the enable signal indicating that the digital information is ready in the memory buffer for access by the one of the first PCI bus interface and the second PCI bus interface; wherein the programmable configuration register comprises an address by-pass enable output and a data by-pass enable output, the other of the primary PCI bus interface and the secondary PCI bus interface comprises an address write counter increment output and a data write counter increment output; and
a logic circuit adapted to generate the by-pass signal in response to either the address by-pass enable output and the address write counter increment or the data by-pass enable output and the data write counter increment.

16. A bus interface bridge circuit for passing digital information between a primary bus and a secondary bus, the busses carrying digital information using respective first and second clock signals having a known minimum skew therebetween, the interface bridge circuit comprising:
a primary bus interface configured and arranged to communicate with the primary bus, the primary bus interface configured and arranged to use the first clock signal;
a secondary bus interface configured and arranged to communicate with the secondary bus, the secondary bus interface configured and arranged to use the second clock signal;
a memory buffer configured and arranged to store the digital information and to be accessed by the primary bus interface and the secondary bus interface;
a programmable configuration register, configurable in response to digital configure information received from the primary bus, and adapted to provide an enable signal to one of the primary bus interface and the secondary bus interface, the enable signal synchronized to one of the first and second clock signals associated respectively with one of the primary bus interface and the secondary bus interface, and indicating that the digital information is ready in the memory buffer for access by the other of the primary bus interface and the secondary bus interface, and wherein the programmable configuration register comprises an address by-pass enable output and a data by-pass enable output, the other of the primary bus interface and the secondary bus interface comprises an address write counter increment output and a data write counter increment output, and wherein a logic circuit is adapted to generate a by-pass signal in response to either the address by-pass enable output and the address write counter increment output or the data by-pass enable output and the data write counter increment output.

17. The bus interface bridge circuit of claim 16, wherein the programmable configuration register is adapted to provide a first enable signal to the primary bus interface and a second enable signal to the secondary bus interface.

18. The bus interface bridge circuit of claim 16, wherein the programmable configuration register comprises an input selectable in response to whether the digital information is address information or data information.

19. The bus interface bridge circuit of claim 16, wherein the programmable configuration register comprises an enable signal output to selectively indicate whether the digital information is address information or data information.

20. The bus interface bridge circuit of claim 19, wherein the programmable configuration register is adapted to provide a first enable signal to the primary bus interface and a second enable signal to the secondary bus interface, the first and second enable signals being independently selectable in response to whether the digital information is address information or data information.

21. The bus interface bridge circuit of claim 16, further comprising:

- a first read counter configured to indicate a read address in the memory buffer;
- a first write counter configured to receive a write increment signal from the other of the primary bus interface and the secondary bus interface and to indicate a write address in the memory buffer;
- a compare circuit configured to compare the read address with the write address and to generate a buffer busy signal when the read address is not equal to the write address; and
- a logic circuit configured to transmit a data ready signal to the one of the primary bus interface and the secondary bus interface in response to the buffer busy signal and the by-pass signal.

* * * * *

UNITED STATES PATENT AND TRADEMARK OFFICE
CERTIFICATE OF CORRECTION

PATENT NO. : 5,978,878
DATED : November 2, 1999
INVENTOR(S) : Lange

It is certified that error appears in the above-identified patent and that said Letters Patent is hereby corrected as shown below:

In the heading, the Assignee should be VLSI Technology, Inc.

Col. 3, line 33: "PCLKRUN#" should read --pCLKRUN#--.

Col. 13, line 63: "programmable" should read --a programmable--.

Signed and Sealed this

Tenth Day of April, 2001

*Attest:*

NICHOLAS P. GODICI

*Attesting Officer*        *Acting Director of the United States Patent and Trademark Office*